United States Patent [19]

Bedis

[11] Patent Number: 4,664,405
[45] Date of Patent: May 12, 1987

[54] TRACTOR POWER LIFT WITH A MECHANICAL DISCONNECT TO POWER SOURCE

[75] Inventor: Michael Bedis, Oconomowoc, Wis.
[73] Assignee: Deere & Company, Moline, Ill.
[21] Appl. No.: 884,860
[22] Filed: Jul. 14, 1986
[51] Int. Cl.⁴ .................... A01D 34/03; A01B 63/104; A01B 59/00
[52] U.S. Cl. ................................ 280/490 A; 172/298; 172/299; 172/300; 172/470; 56/15.9; 74/480 R
[58] Field of Search ............... 172/299, 298, 297, 302, 172/303, 300; 56/15.8, 15.9, 6, 13.7, DIG. 22; 280/490 A, 461 A; 292/336.3, 251, 212; 74/480 R, 335

[56] References Cited
U.S. PATENT DOCUMENTS 2,973,043  2/1961  Elfes ...................................... 172/470
4,340,128  7/1982  Yamaue et al. ................... 74/480 R Primary Examiner—John J. Love
Assistant Examiner—Karin L. Ferriter

[57] ABSTRACT

On a tractor having a main frame channel that includes an overhead wall and depending side walls and a lift arm mounted on a rockshaft for raising and lowering a tractor-supported implement, a power means for rocking the rockshaft with a lost motion connection between the power means and the rockshaft, a vertical member extending through the overhead wall and freely swivable therein and having a manual controllable portion above the transverse wall structure and an axially hollow section beneath the wall structure, a fixed pipe-like member in axial alignment with the swivel member and having an internal threaded portion, a stud threaded into the pipe-like member and having a head seated in and connected to the hollow section of the swivel member to swivel therewith, and a vertically disposed rod having an upper end portion extending to and engaging the lower end of the stud and a lower end connected to the rockshaft in radial offset relation to its axis.

11 Claims, 4 Drawing Figures

TRACTOR POWER LIFT WITH A MECHANICAL DISCONNECT TO POWER SOURCE

BACKGROUND OF THE INVENTION

Current small or compact utility tractors are used for mowing, as well as for doing utility work such as rotary hoeing, plowing and cultivating small areas of ground. Often, this requires a mower deck to be mounted on the central portion of the tractor and additional implements to be mounted on a typical 3-point hitch extending from the rear of the tractor. Since these tractors are relatively small, it is necessary to utilize single power units, such as a hydraulic cylinder, to do many of the jobs in raising and lowering the implements. For example, it may be desirable to provide a small front-mounted loader on the utility tractor that utilizes hydraulic cylinders to raise and lower the loader arms. Generally, therefore, it may be desirable to provide lift systems on the front, central and rear portions of the tractor with a very minimum number of hydraulic cylinders for operating the lift systems.

Often, for example, it is desired to use the power unit or hydraulic system that operates the linkages in the rear-mounted 3-point hitch to raise and lower a centrally mounted mower deck. Also, while a mower deck is mounted on the central portion of the tractor, it may be desirable to mount and use a loader extending from the forward end of the tractor. Often, due to limited hydraulic capacity on the small tractor, it will be necessary to use cylinders using the same hydraulic circuit for operating the lift mechanism for the centrally mounted mower and the loader arms.

Typically, to accomplish some of the above, there is provided on the tractor a cable or linkage connection between the lower draft links of the 3-point hitch and the lift mechanism for raising and lowering the mower deck. In this manner, the single hydraulic cylinder which is utilized to operate the draft links may also be used to raise and lower the mower deck. This creates no problem when there is no rear-mounted implement and it is only desired to raise and lower the mower deck. Likewise, if there is no mower deck on the mid-portion of the tractor, an implement mounted on the 3-point hitch creates no problem. The problem exists when it is desired to retain a mower deck on the tractor while using an implement mounted on the 3-point hitch. The mower and implement will be raised and lowered in unison which often is not desired. In many instances, it is desirable to retain the mower deck in an uppermost or transport position while using a piece of equipment of the 3-point hitch.

In order to alleviate this condition, it is typical to move the connecting cable or linkages outboard of the tractor housing or frame so that access can be made to the linkage or cable for purposes of locking the mower in its uppermost position. The appearance of a utility tractor affects the sales potential of the tractor, i.e., a clean-looking, uncluttered tractor has more sales appeal than one that has exposed cables and linkages. Also, it is desired to cover the cable and linkages so as to protect them against injury or damage from the elements.

It is often desirable to operate only the rear 3-point linkage for raising or lowering an implement thereon and to hold the mower deck in a raised or inoperative position. To do this, it is necessary for the tractor operator to, in some manner, disconnect the linkage or cable that extends from the lower lift system of the rear of the tractor from the rockshaft that operates to raise or lower the mower deck. It is also necessary, in some manner, to hold the deck in a raised position. To do this, the operator must get off the tractor and physically attach transport latches on the lift system or between the tractor frame and mower deck. Similarly, if a mower deck is supported on the tractor at the same time a front mounted loader is supported on the front end of the tractor and the power lift systems are interconnected, a similar operation of holding or latching the mower deck in a raised position must be done.

On tractors having the capacity of using a single hydraulic circuit for moving a central mower deck or other type of implement to a desired vertical position, the hydraulic system is often used to retain or lock the implement in that position. Such hydraulic systems often are controlled by a lever that may be moved to different positions having visual readings alongside that indicates the height of the implement. The problems that are inherent in such systems are twofold. First, there are leakages in hydraulic systems so that in day-to-day operation, movement of the lever to a desired position does not always give the same height position of the implement. Often, if leakage is severe enough, the height position of the implement will vary in the same period of operation. Second, the weight of the mower or implement is carried continuously and totally by the hydraulic system and such is not considered desirable design practice since it may cause premature leakage or other failure of the system.

With the above in mind, it is a primary object of the present invention to provide a rockshaft and lift arms thereon for raising and lowering the deck on the central portion of the tractor. The rockshaft is interconnected to a power source, whose primary purpose is to raise and lower the trailing links of the 3-point linkage on the rear of the tractor. This is done through a linkage that extends lengthwise of the tractor and in a frame channel that extends normally in a fore-and-aft disposition on the tractor. The linkage has a lost motion connection therein whereby the power means can operate the rearwardly extending links through a range that does not affect the corresponding range of rocking action of the transverse rockshaft. Provided on the floor of the tractor, which is the overhead wall structure of the channel, is a locking device in the form of an extendible and retractable link that is controlled on the floor by a swivel action. As the extendable and retractable linkage is extended through the swivel action, the rockshaft will be locked to hold the mower deck in a raised or desired grass cutting position. It should be understood that the locking device is not meant, in any manner, to affect raising and lowering of the mower deck, but only serves the purpose of locking the mower deck in a raised or desired grass mowing height after the power unit is used to force the deck into that position.

It is also the purpose of the present invention to provide a unique locking system that is composed of a swivel member extending through the floor or overhead panel of the tractor frame channel with a portion projecting above the floor and a portion projecting beneath the floor. The swivel member is freely swivable on the floor but is fixed against the vertical movement with respect thereto. The lower end of the swivel member is hollow and has an internal hexagonal axial opening. Fixed against rotation on the channel wall structure is a pipe-like member disposed beneath and generally as a downward continuation of the swivel member. This member has an internal threaded portion. A threaded stud with an hexagonal head fitting into the open bottom end of the swivel member is threadedly mounted in the threaded portion. As the swivel member is rotated, the stud is adjusted vertically in the threaded internal portion of the pipe-like member. A vertical connecting rod is connected to the rockshaft in a radial offset position with respect to its axis and has its upper end extending into the lower end of the pipe-like member so as to contact the lower end of the stud. As the swivel member is rotated, it affects the vertical movement of the rod and a corresponding rocking of the rockshaft. Upon the power means rotating the rockshaft so as to position the corresponding implement or mower deck, the swivel may be operated to engage the rod and to thereby hold the mower in its desired position. The load of the mower deck is thereby transferred from the hydraulic system to the rod, stud and eventually to the frame channel of the tractor. Also, until the swivel member is moved from its locked position, the mower deck will always return to the same height even if the hydraulic system temporarily raises it. The lost motion in the linkage extending from the power means to the rockshaft will permit the power means to be used to operate other structure and equipment upon the tractor. In a modification of the invention, a similar arrangement is made for locking the mower in an up or transport position so that the hydraulic power may be used exclusively for operating front mounted implements.

DESCRIPTION OF THE INVENTION

Figure 1:
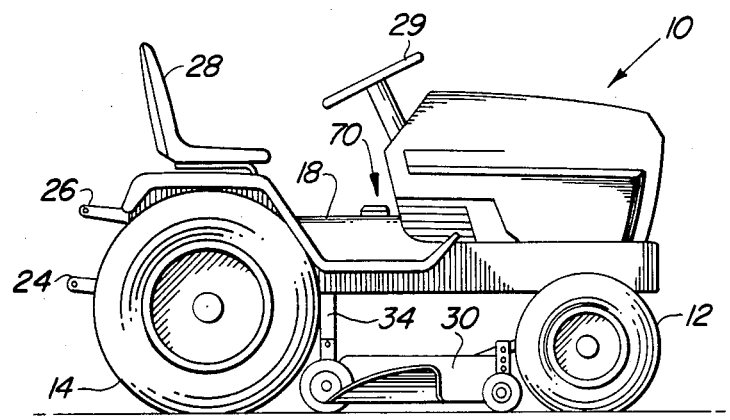
FIG. 1 is a side view of a tractor having a mower deck mounted on its underside and having 3-point hatch links projecting from its rear end.
Figure 2:
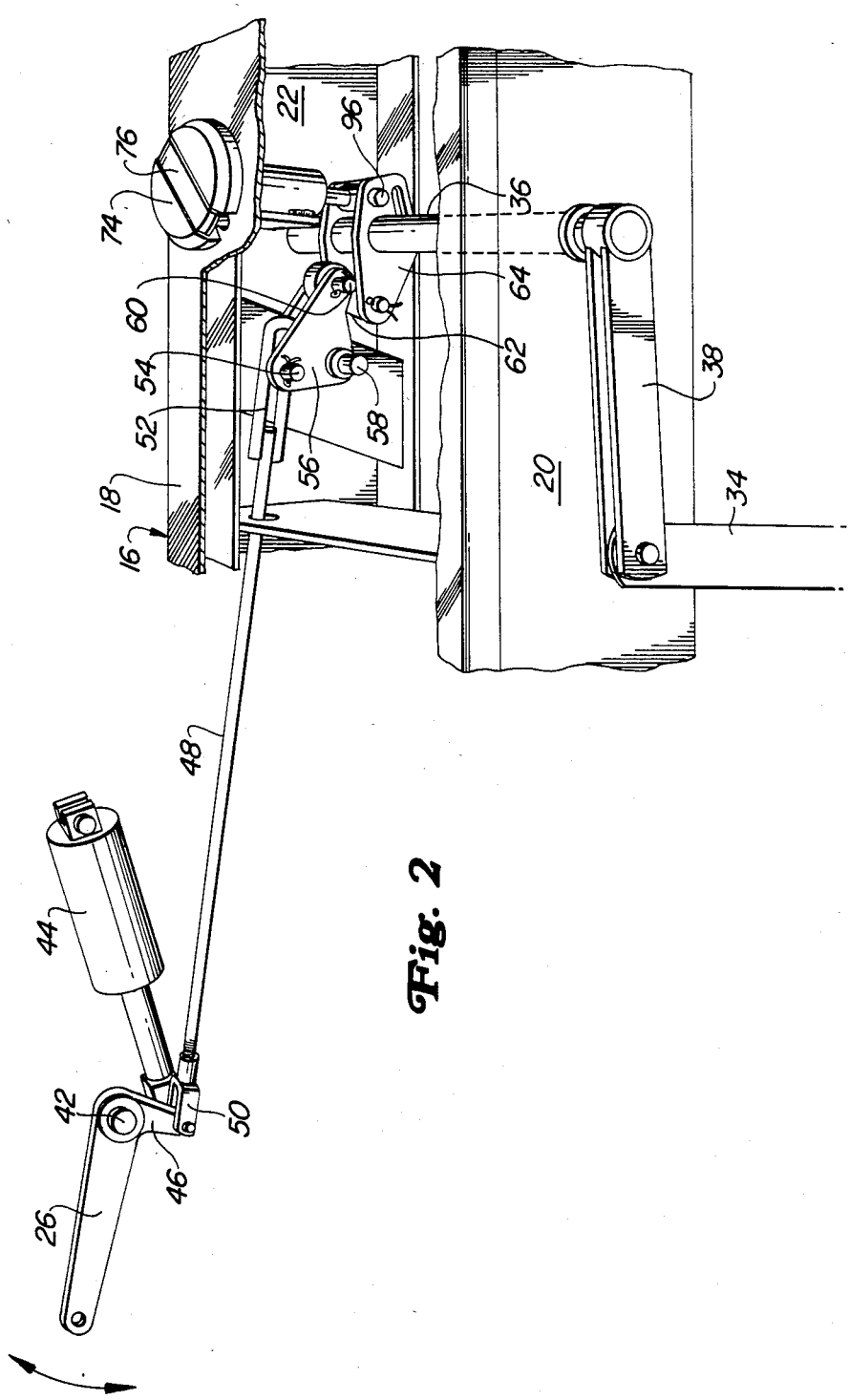
FIG. 2 is a perspective view of the linkage extending between the power means, the lower links of the 3-point linkage and the rockshaft and lift arms that operate to raise and lower the mower deck and a portion of the frame channel of the tractor, with parts broken away to show the linkage.

Referring first to FIGS. 1 and 2, a small utility tractor 10 is provided with front and rear wheels 12, 14 respectively. The tractor includes a conventional-type main frame composed, in part, by a fore-and-aft extending channel or wall structure 16 that includes an overhead wall structure 18 that interconnects transversely spaced vertical wall structures 20, 22. The overhead panel, in a sense, is a floor panel just forward of an operator's station indicated by a seat 28 and steering wheel 29. Mounted on the rear portion of the tractor is a conventional type 3-point hitch that includes a pair of upper lift links 26 and a pair of transversely spaced lower draft links 24. Also carried on the tractor is a centrally located mower deck 30 that is raised and lowered by a pair of transversely spaced vertical links, only one of which is shown at 34, that project upwardly into the channel 16 and which are connected to a transverse rockshaft 36 by means of lift arms, one of which is shown at 38.

The upper links 26 of the 3-point hitch are mounted on a rear transverse rockshaft 42 that is power-operated through use of a hydraulic cylinder 44 to rock the rockshaft 42 and to raise and lower, as desired, the respective lift links 26. An integral arm 46 extends downwardly from one of the links 26 where it is connected through a yoke 50 to a fore-and-aft extending rod 48. The forward end of the rod 48 is slotted at 52. Carried in the slotted end 52 is a pin 54 which attaches the rod to a bell crank 56 mounted to rock about a short transverse shaft 58 carried on the main frame 16. An arm of the bell crank 56 is pinned at 60 to a short depending link 62 which is connected at its lower end to a rock arm 64 fixed to the rockshaft 36.

Referring now to the operation of the power lift structure, when the cylinder 44 is extended to raise the lift links 26 of the 3-point hitch, the rod 48 will be pulled rearwardly until the pin 54 reaches the end of the slotted end 52 and continued movement of rod 48 will rock the bell crank 56 in a counterclockwise direction, as viewed in FIG. 2. This will cause the rockshaft 36 to rotate in a clockwise direction which will raise the mower lift arms 38 and the entire deck 30. When the cylinder 44 is retracted for purposes of lowering the lift links 26, the mower deck will at the same time be permitted to be lowered by gravity since the pin 54 will be seated in the forward end of slot 52. In many instances, however, it may be desired to disengage the mower deck while operating an implement mounted on the rear lift links 26. Simple structure, presently to be described, is utilized to lock the mower in its raised or any position desired and which permits the use of the lift links 26 for independently controlling the position of a rear mounted implement when the mower is at its fully raised position.

Figure 3:
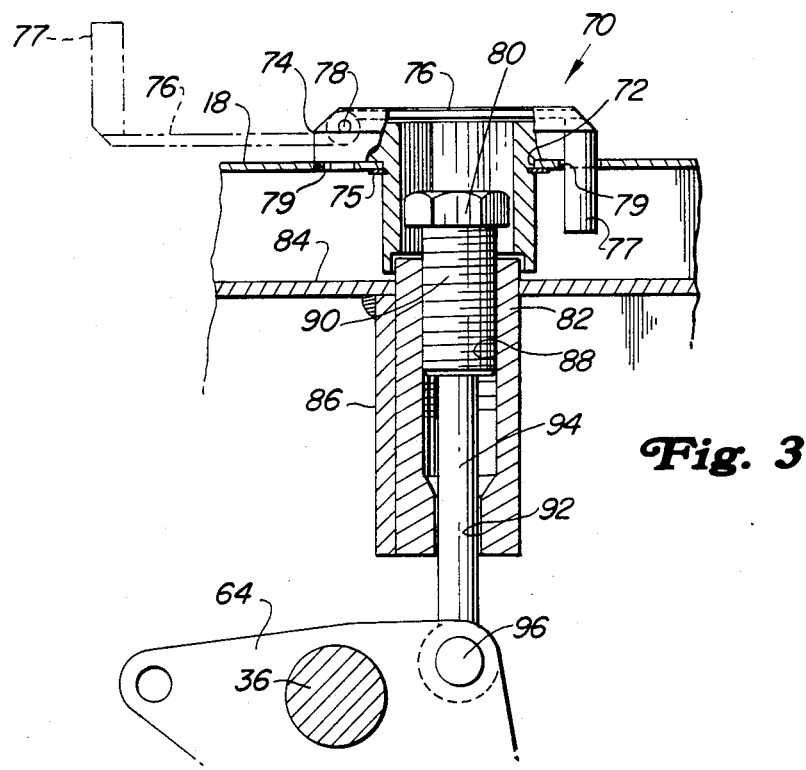
FIG. 3 is a vertical sectional view of the lock mechanism that operates to lock the mower deck in its raised or preferred position.

A swivel member 70 extends through an opening 72 in the upper overhead wall 18. Part of the swivel member projects above the wall 18 and part below the wall 18. The part above the wall is in the form of a relatively flat knob which has a diametrically extending slot 74 across it. A snap ring 75 retains the swivel member 70 on the floor panel 18. Seated in the slot 74 is a retractable handle 76, pivoted at 78 to the top portion. The handle may be swung vertically and extended outwardly from the swivel 70, as indicated in dotted representation in FIG. 3, and used in turning or twisting the swivel member 70. A small finger knob 77 is provided on the end of the handle to aid this purpose. The knob 77, when the lever is retracted, extends through openings 79 in the overhead panel 18, thereby locking the swivel against rotation. The swivel has a hollow interior shaped to conform to the shape of the head of a bolt 80. A pipe-like member 82 is welded to a frame flange 84 and a vertical structural member 86 that extends alongside the pipe-like member 82. The pipe-like member 82 is, in general, a downward continuation of the swivel member 70 and its axis is a downward continuation of the swivel axis of the member 70. The pipe-like member 82 has an upper internally threaded portion 88 that receives the lower threaded shank end 90 of the bolt 80. The pipe-like member 82 is necked down at 92 so as to loosely receive and guide a vertical rod 94, the lower end of which is pivotally mounted on a horizontal pin 96 extending through the rock arm 64. The pin 96 is radially and forwardly offset from the shaft 36. The upper free end of the rod 94 bears against the lower surface of the bolt shank 90. As the swivel member 70 is rotated, it will cause the bolt 80 to thread its way along the threaded surface 88.

In operation, when it is desired to lock or latch the mower deck in a desired vertical position, the hydraulic cylinder 44 is operated to rotate the bell crank 56 which, in turn, causes the rock arm 64 to move, thereby positioning the rod 94 in the member 82. Then, by swiveling the swivel member 70 so as to turn the bolt in a direction downwardly on the threaded surface 88 until it contacts the upper free end of rod 94, the rock arm 64 will be locked against counterclockwise rotation. The knob 77 will be inserted in the corresponding opening 79 which prevents further swiveling of the member 70. The slot 52 will permit the hydraulic cylinder 44 to extend and retract since the rod 48 will merely slide back and forth on the pin 54. When the mower is in its fully raised position, the cylinder 44 and the lift links 26 may thereafter be utilized only for the purpose of raising and lowering a trailing implement mounted on the 3-point hitch.

Figure 4:
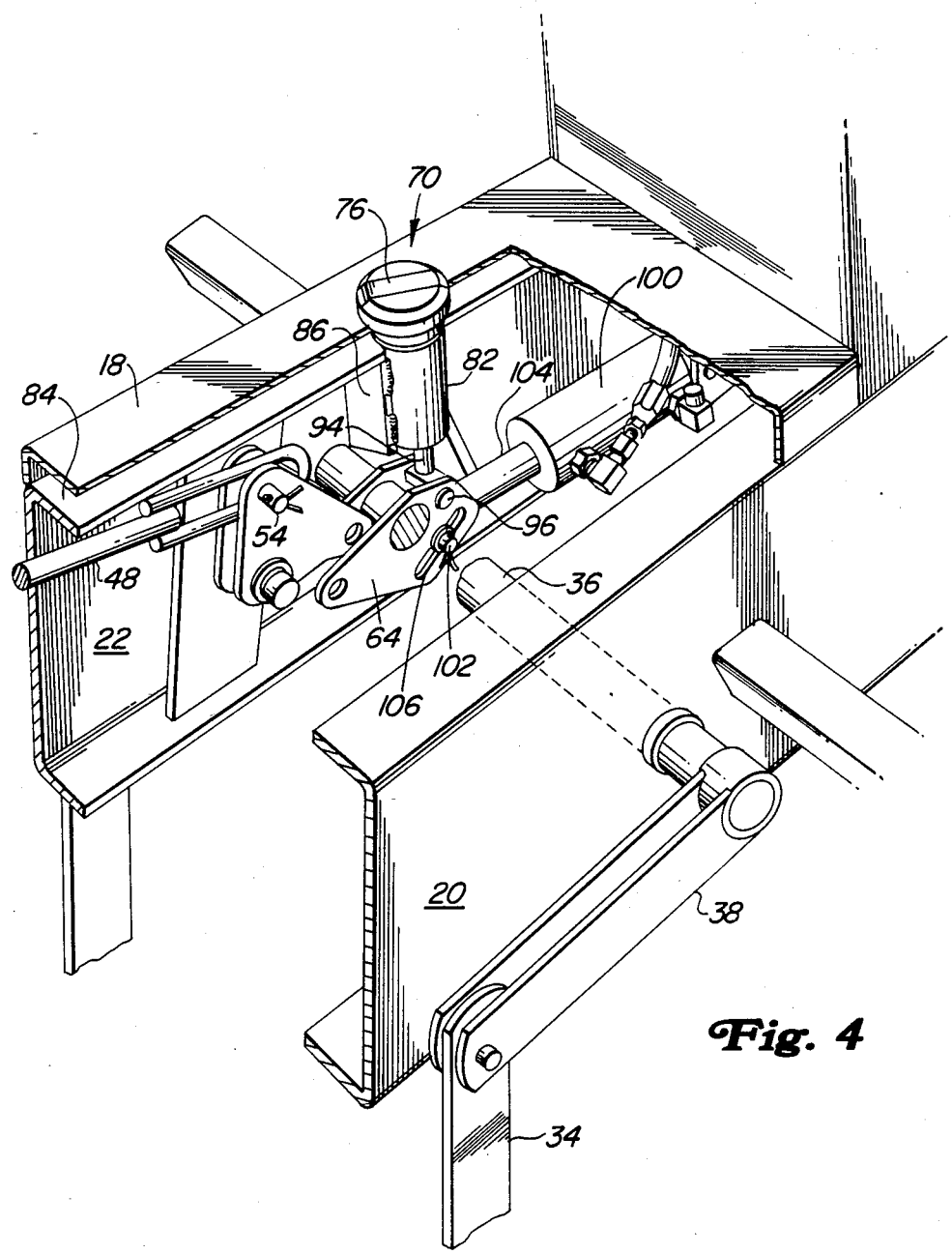
FIG. 4 is a perspective view of a modification of the present invention showing a hydraulic cylinder connected directly to the lift linkage for the mower deck.

In the modified form of the invention shown in FIG. 4, a connecting link 62 is removed and a power source in the form of a hydraulic cylinder 100 is connected directly to the rock arm structure 64 by means of a pin 102 that extends through the distal end of the piston rod 104 and rests in a slot 106. It should, however, be understood that the cylinder 100 and its rod 104, slot 106, etc., may be used on a tractor having a 3-point hitch system. This additional system provides completely independent mid and rear lift systems on the tractor. The rockshaft 36 is again used to raise and lower the mower deck by extension and retraction of a cylinder 100. In many instances, however, it will be desirable to remove the load from the cylinder 100 and for this reason, the stop structure referred to in the previous form of the invention may be utilized substantially in the same way that has previously been described. Upon the mower deck being vertically positioned by the cylinder 100, the swivel member 70 is operated to move the bolt 90 downwardly to contact the upper end of rod 94 while the mower still is in its desired position. This will hold the mower in this position as the cylinder 100 is retracted and the pin moves in its lost motion zone along the slot 106. At this time, while the cylinder 100 may be activated to extend and retract, there will be no load on it by the mower, if the latter is in its fully raised position. Therefore, if connected, for example, in series with other cylinders operating other tractor-mounted equipment, the total work load may be applied in those other cylinders.

It should also be noted that by using a stop system as presently described, that the entire linkage and structure used in raising and lowering the deck may be confined in the channel formed by the overhead and sidewall structures of the frame. Thus, the appearance of the tractor may be kept relatively clean without having external linkages and levers for locking out the power units and/or linkages extending from the power units to the rockshaft structure which raises the mower deck.

I claim:

1. On a tractor having front and rear wheels and a frame structure, an operator's station supported on the frame structure, a floor panel adjacent the front side of the station, a mower deck supported on the tractor beneath said floor panel, a transverse rockshaft supported on the frame structure above the mower deck, and lift arms fixed to the rockshaft and having means at their distal ends connected to the mower deck, the improvement comprising an extendable and retractable hydraulic cylinder mounted on the frame structure and having means connecting it to the rockshaft in radial offset relation to the rockshaft axis, said means having a lost motion connection therein so that said cylinder will, by use of a power stroke, raise said mower deck by may, in a return stroke, be ineffective to lower said mower deck; a swivel member mounted on the floor panel to freely swivel about an upright axis and having a cap portion extending above the floor panel and a lower portion extending below the floor panel; a vertically adjustable member operatively connected to said lower portion to effect vertical adjustment thereof in response to turning of said swivel member; and means on said rockshaft engageable with said adjustable member to limit downward adjustment of the mower deck after said cylinder raises said mower deck.

2. The invention defined in claim 1 further characterized by said cylinder being operatively connected to an implement mounted on one end of the tractor whereby said mower deck may selectively be locked in a raised position by said adjustable member and said cylinder may continue to be used to adjust said implement as it moves in the range of said power and return strokes.

3. The invention defined in claim 2 in which said cylinder is connected to said implement through an implement rockshaft and said means connecting the cylinder to said transverse rockshaft includes a connecting rod having opposite ends connected in radial offset relation to the axis of said rockshafts for rocking said rockshafts in unison, and the lost motion connection is a slotted connection between at least one end of the rod and its respective rockshaft.

4. The invention defined in claim 2 further characterized by said cap portion being located on said floor panel so that it may be manually adjustable by an operator located at said operator station.

5. The invention defined in claim 4 in which said cap portion is diametrically slotted adjacent its top surface and further characterized by a lever mounted on the cap portion to more between a position in which it is seated in the slot and a position extending radially outward of said cap portion.

6. On a tractor having a wheel-supported main frame including, at its fore-and-aft mid-portion, an overhead wall structure interconnecting a pair of sidewall structures, a pair of arms extending rearwardly from the rear end of the frame an mounted on a common rockshaft, said arms being raised and lowered by a power means that rocks the rockshaft, a transverse rockshaft supported on the frame forwardly of said common rockshaft in the general area of the fore-and-aft mid-portion of the frame and having a fore-and-aft lift arm mounted thereon, beneath said overhead wall and between said sidewall structure, the improvement comprising: a linkage extending between said common rockshaft and said transverse rockshaft for rocking the respective rockshafts in unison by said power means, said linkage being disposed in the confines between the sidewall structures and beneath the overhead wall structure and said linkage having a lost motion connection therein whereby there will exist an angular range or rocking action by said common rockshaft that does not affect a corresponding range of rocking action of said transverse rockshaft; an arm member mounted on and rockable with the transverse rockshaft beneath said overhead wall structure; a swivel member mounted on the overhead wall structure to freely swivel about a vertical axis with a manually operable upper portion extending above the wall structure and a hollow lower portion extending beneath the wall structure; a vertical pipe-like member fixed to said main frame in axial alignment with said swivel member and having an internal threaded portion; a stud threaded into the pipe-like member and having a head seated in and connected to the hollow lower portion of the swivel member so as to swivel therewith; and a vertically disposed rod having an upper end portion extending into and axially shiftable in the pipe-like member and engageable with the lower end of said stud, said rod having a lower end connected to said arm member.

7. On a tractor having a wheel-supported main frame including an overhead wall interconnecting a pair of vertical sidewall structures, a transverse rockshaft supported on the frame and having a fore-and-aft lift arm member mounted thereon beneath said overhead wall and between said sidewall structure, the improvement comprising: a power source; means extending between the power source and said transverse rockshaft for rocking the rockshaft by said power means, said means being disposed in the confines between the sidewall structures and beneath the overhead wall, said means having a lost-motion connection therein whereby said power means may operate over a limited range that does not affect a corresponding range of rocking action of said transverse rockshaft; an arm member mounted on and rockable with the transverse rockshaft beneath said overhead wall; a swivel member mounted on the overhead wall to freely swivel about a vertical axis with a manually operable upper portion extending above the wall and a hollow lower portion extending beneath the wall; a vertical pipe-like member fixed to said frame in axial alignment with said swivel member and having an internal threaded portion; a threaded stud threaded into the pipe-like member and having a head seated in and connected to the hollow lower portion of the swivel member so as to swivel therewith; and a vertically disposed rod having an upper end portion extending into and axially shiftable in the pipe-like member and engageable with the lower end of said stud, said rod having a lower end connected to the arm member.

8. The invention defined in claim 7 further characterized by a retractable lever on the upper portion of the swivel member radially extensable and retractable for providing leverage in turning the swivel member.

9. The invention defined in claim 8 in which the retractable lever has a lock member thereon which engages a complementary portion of said frame for preventing adjustment of said swivel member when the lever is in a retracted position.

10. The invention defined in claim 8 in which the upper portion of the swivel member has a flat upper surface that is only slightly above the overhead wall structure.

11. On a tractor having front and rear wheels and frame structure, an operator's station supported in the frame structure, a floor panel adjacent the front side of the station, a mower deck supported on the tractor beneath said floor panel, a transverse rockshaft supported on the frame structure above the mower deck, and lift arms fixed to the rockshaft and having means at their distal ends connected to the mower deck, the improvement comprising an extendable and retractable hydraulic cylinder mounted on the frame structure and having means connecting it to the rockshaft in radial offset relation to the rockshaft axis, said means having a lost motion connection therein so that said cylinder will, by use of a power stroke, raise said mower deck but may, in a return stroke, be uneffective to lower said mower deck; a vertical guide member mounted on the frame structure beneath the floor panel; a guide rod supported on the rockshaft in radial offset relation to its axis and extending into and vertically guided by said guide member; an adjustable one-way stop on the vertical guide member for preventing downward shifting of the mower deck; and means on the floor panel for adjusting said one-way stop.

* * * * *

UNITED STATES PATENT AND TRADEMARK OFFICE
CERTIFICATE OF CORRECTION

PATENT NO. : 4,664,405

DATED : 12 May 1987

INVENTOR(S) : Michael Bedis

It is certified that error appears in the above-identified patent and that said Letters Patent is hereby corrected as shown below:

<u>Column 6</u>

In claim 1, line 6, delete "by" (second occurrence) and insert -- but -- .  Claim 5, line 41, delete "more" and insert therefor -- move -- .  Claim 6, line 48, delete "an" and insert therefor -- and -- .

Signed and Sealed this

Ninth Day of August, 1988

Attest:

DONALD J. QUIGG

Attesting Officer

Commissioner of Patents and Trademarks